3 Sheets—Sheet 2.

E. R. WHITNEY.
GRAIN-BINDER.

No. 180,402.  Patented July 25, 1876.

WITNESSES
Henry N. Miller
C. L. Emert

INVENTOR
Edwin R. Whitney
By Alexander Mason
Attorneys

E. R. WHITNEY.
GRAIN-BINDER.

No. 180,402.                    Patented July 25, 1876.

UNITED STATES PATENT OFFICE

EDWIN R. WHITNEY, OF MAGOG, QUEBEC, ASSIGNOR OF ONE-THIRD HIS RIGHT TO THOMAS CONANT, OF EAST WHITBY TOWNSHIP, ONTARIO, CANADA.

IMPROVEMENT IN GRAIN-BINDERS.

Specification forming part of Letters Patent No. 180,402, dated July 25, 1876; application filed April 7, 1876.

*To all whom it may concern:*

Be it known that I, EDWIN R. WHITNEY, of Magog, in the county of Stanstead and in the Province of Quebec, Canada, have invented certain new and useful Improvements in Binding Attachments for Harvesters; and do hereby declare that the following is a full, clear, and exact description thereof, reference being had to the accompanying drawings, and to the letters of reference marked thereon, making a part of this specification.

My invention relates to grain-binders for harvesters; and has for its object to take the straw from the platform of a harvester, bind the same into a sheaf by a rotary movement around a cord, and cast off by a fork, the whole acting automatically; and to this end the nature of my invention consists, essentially, in an apron-elevator, one end winding around a roller, the other end connecting with flexible springs attached to the platform, whereby the apron, after having delivered the load into a rotary scoop, is retracted by the springs, to receive from the harvester another load; also, in a rotary scoop, into which the grain is deposited to be bound by winding around a cord held by a needle; also, in a spring-retainer, to compress the grain in the scoop; also, in a needle automatically projected to fasten the binding by passing the needle thereunder; also, in a hook and cutter for drawing the cord running through the needle's eye to a proper length, and automatically cut it at the proper distance; and, also, in the construction and combination of parts, as will be hereinafter more fully set forth.

Figure 1:
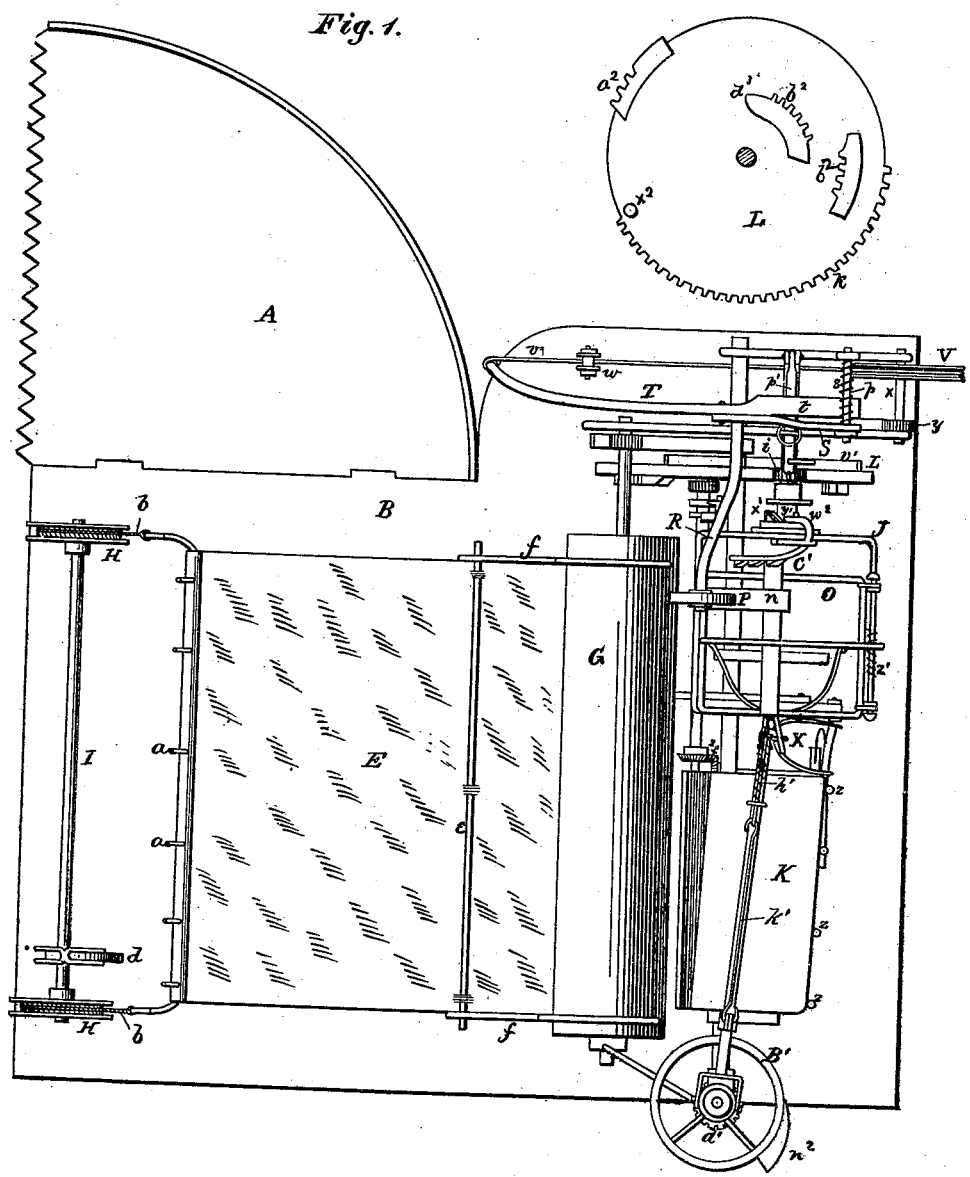
Figure 2:
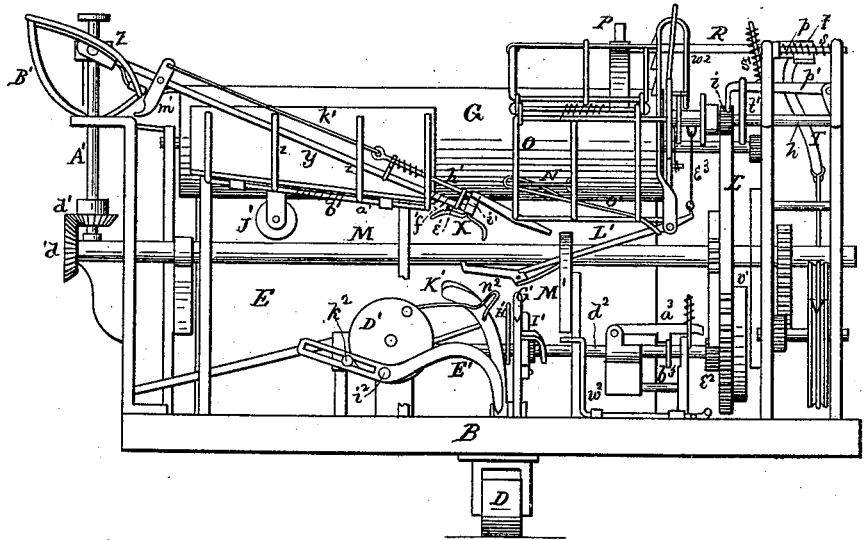
Figure 7:
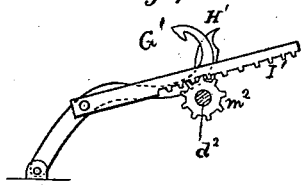
Figure 6:
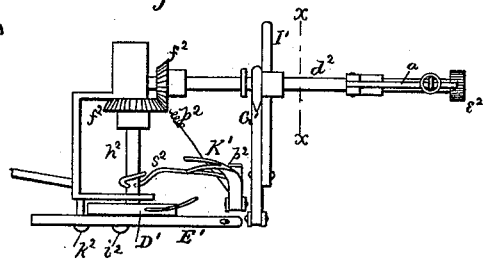
Figure 3:
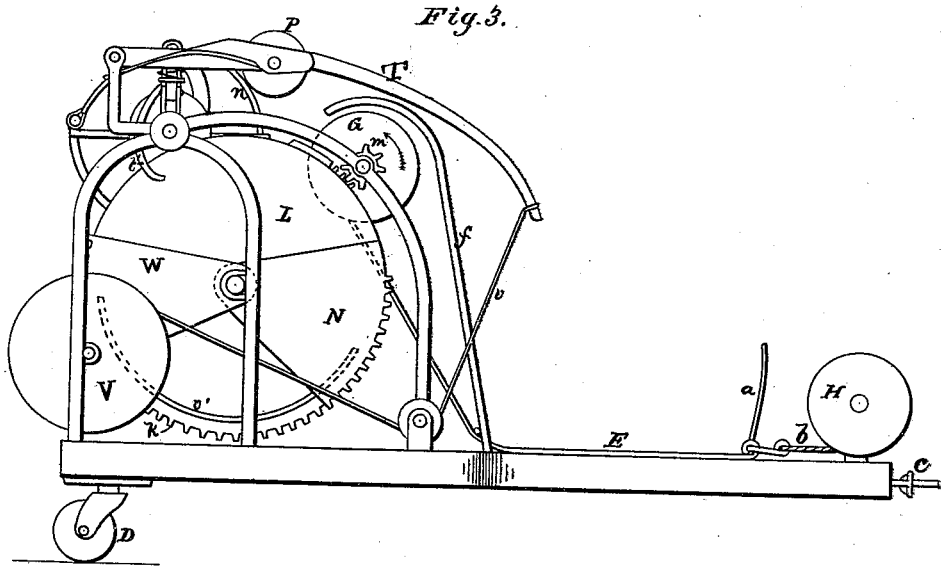
Figure 4:
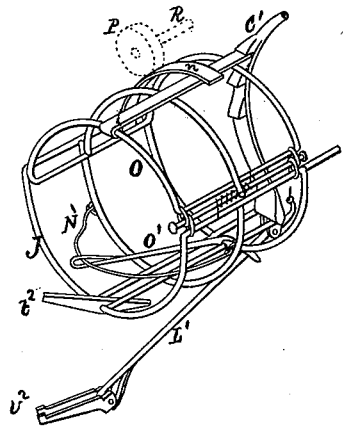

In the annexed drawings, Figure 1 is a plan view of my invention. Fig. 2 is a rear elevation of the same. Fig. 3 is a side elevation thereof. Fig. 4 is a perspective view of the rotary scoop with its attachments. Figs. 5, 6, 7, and 8 are detached views of parts thereof.

A represents the ordinary reaper-table, to which the binder-platform B is hinged, said platform being connected at its forward part to the reaper by a swivel, C, and its rear part supported by a caster-wheel, D. E represents the apron, onto which the grain is moved from the reaper-table by any of the well-known rakes in common use. The rear end of the apron E is attached to a drum, G, so as to revolve or roll up on the same, to place the bundle in the scoop, and the front end of the apron is provided with a rod having upward-projecting teeth $a$ $a$, which follow the bundle, and press the same into the scoop, and likewise straighten the bundle if it does not fall straight on the apron. The front end of the apron is, at each side, by a cord, $b$, connected with a pulley, H, on a shaft, I, which shaft has one or more springs, $d$, attached to it, to cause the apron to return and lie smooth and flat on the frame. At a suitable point on the apron is secured a cross-rod, $e$, the ends of which project beyond the sides of the apron, and pass under guide-rods $f$ $f$, said rods guiding the apron to its proper place, so that it may always lie smooth. The grain is received from the apron in a rotating scoop, J, and a stationary scoop, K. The rotating scoop J is secured on a shaft, $h$, provided with a pinion, $i$, which is rotated intermittently by a cogged segment, $k$, formed on or attached to a wheel, L, secured upon the rotating main shaft M. On this shaft is further secured a cogged segment, N, that operates a pinion, $m$, on the journal of the drum G, to rotate the same at the proper time for winding up the apron E, and carry the grain over the drum. The rotating scoop J is provided with a hinged cover, O, which closes or shuts up as soon as the bundle is placed therein by the apron E. This is accomplished by means of a wheel or roller, P, on the end of an arm, R, which wheel or roller, being depressed, rolls over a track, $n$, on the cover O and closes the same. The arm R, which carries the wheel or roller P is attached to an arm, S, projecting from a shaft, $p$, around which is a spring, $s$, so arranged as to raise said arms and wheel up from the cover.

To the end of the arm S is attached a lever, T, from the rear end of which extends a spring, $t$, backward under the shaft $p$, allowing the roller P to give way or close up for any size bundle.

The outer or front end of the lever T has a wire, $v$, attached to it, which passes under an idle pulley, $w$, to a large pulley, V, secured upon a shaft, $x$, and provided with a pinion, $y$. This pinion and shaft are rotated at the proper time by a cogged segment, W, secured on the main shaft M so as to wind up the wire on the pulley V, thereby bringing down the wheel or roller P to close the scoop-cover O. As soon as the segment W clears the pinion $y$, the spring $s$ on the shaft $p$ returns the parts to their proper positions.

The stationary scoop K is at its rear edge provided with a series of vertical teeth, $z$, attached to a rod, $a^1$, underneath the scoop, said rod being actuated by a spring, $b^1$, to hold the teeth in an upright position while the bundle is being revolved for tying, and when the fork is put in motion to throw the bundle out, these teeth or standards give to the pressure thereof.

X represents the fork, which is pivoted on the inner end of a shaft, Y, the outer end of which has a fork pivoted to a collar, Z, feathered upon a vertical shaft, A′, so as to revolve therewith and slide up and down on the same. The shaft A′ is rotated continuously directly from the main shaft M by beveled or mitered gears $d^1$ $d^1$. To the frame or standard supporting the shaft A′ is attached an inclined frame or track, B′, over which the shaft Y passes in its revolution.

The fork X is held by means of a spring, $f^1$, against a stop, $e^1$, on the shaft, to be in proper position to catch the bundle as the fork descends. To prevent the fork from tipping by the weight of the bundle, a spring-bolt, $h^1$, is in front of a lug, $i^1$, at the hub of the fork. This bolt is, by a rod, $k^1$, connected with a lever, $m^1$, pivoted to the shaft Y, and the lower end of this lever strikes a lip, $n^2$, on the track B′, which withdraws the bolt $h^1$ from the lug or catch on the fork, and allows the fork to turn down at the proper time and throw off the bundle.

The rotating scoop is held firmly in the proper position to receive the grain by means of a forked lever, $p^1$, grasping the pinion $i$, said lever being held down by a spring, $s^1$, and provided with a downward-projecting arm, $t^1$, which is actuated by a flange, $v^1$, on the side of the main wheel L, to raise the forked lever $p^1$ just before the cogged segment $k$ of said wheel L is to mesh with the pinion $i$ and operate the scoop.

The scoop-cover O is held down by means of a spring-ratchet, C′, attached permanently to the scoop J. This spring-ratchet C′ is provided with an arm, $w^2$, which is operated by a cam, $x^1$, on a flanged sleeve, $y^1$, placed loosely upon the shaft $h$. When this sleeve is turned a short distance around the shaft the cam $x'$ actuates the arm $w^1$ so as to draw back the ratchet C′, thereby releasing the scoop-cover and allowing it to fly open by the action of the spring $z^1$, connected to its hinge.

Figure 8:
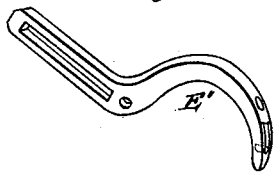

The flanged sleeve $y'$ is provided with a single cog, which is actuated by a small cogged segment, $a^2$, on the side of the wheel L, so as to turn the sleeve at the proper time, and just the desired distance. On the inner side of the wheel L are, further, two small cogged segments, $b^2$ $b^2$, arranged to mesh on opposite sides, with a pinion, $e^2$, secured on a shaft, $d^2$, in such a manner that, as soon as one segment has rotated this shaft in one direction, the other segment will take hold and rotate it in the opposite direction. This shaft $d^2$ is, by beveled or mitered gears $f^2$ $f^2$, connected with another shaft, $h^2$, having upon its rear end a disk, D′. This disk is provided with a wrist, $i^2$, on which the needle E′ is pivoted. This needle is constructed as shown in Fig. 8, its front end being curved for the passage of the thread, and its rear end slotted and placed over a stationary pin, $k^2$. As the disk D′ revolves, the needle obtains the necessary motion to revolve around above the band.

G′ is a hinged or pivoted hook or catch, which hooks or catches the thread or cord through the band, and draws it back to the knife H′ to be cut off, said knife being attached to, and revolving with, the shaft $d^2$. The hook G′ is operated by means of a rack-bar, I′, pivoted to the same, and engaging with a pinion, $m^2$, on the shaft $d^2$, whereby the hook G′ is moved backward and forward by the reverse motion of the shaft.

The thread or twine passes from a spool, J′, through a tension-hook, $n^2$, attached to the disk D′, and from thence through the forked end of a back catch, K′, which is hinged at its lower end, and held in position by the springs $p^2$. This catch is operated by a pin, $s^2$, on the needle-shaft, which allows the catcher to catch the end of the thread while the needle passes to its proper place for wrapping.

L′ represents a thread-catcher, which combines with a tongue, $t^2$, and has hooks $v^2$ on the end to draw the thread through after it is wrapped around the bundle. M′ is a raised track to close the thread-catcher tight, which track is operated by a crank-shaft, $w^2$, actuated by a pin, $x^2$, projecting from the side of the main wheel L. In the rotating scoop J is a hinged bail, N′, with slotted pivoted arm O′, connecting with the thread-catcher L′, which protects said thread-catcher, and closes it to prevent breakage, especially if used without bundle in the scoop. The shaft $d^2$ is held rigidly in position by means of a pivoted spring-catch, $a^3$, entering a notch in a flange, $b^3$, on the shaft, said catch being raised out of the notched flange by a projection, $d^3$, on the first cogged segment $b^2$ that is to engage with the pinion $e^2$, so as to release the shaft just in time for said segment to operate upon it. The thread-catcher L′ is at its inner end, by a rod, $e^3$, connected with the flanged sleeve $y'$, so as to be operated at the proper time.

Having thus fully described my invention, what I claim as new, and desire to secure by Letters Patent, is—

1. In a grain-binder an apron-elevator, one end of which is attached to and wound upon an intermittently-rotating drum, and retracted by means of springs, substantially as herein set forth.

2. The combination of the drum G, apron E, with teeth $a$, cords $b$, pulleys H, shaft I, and one or more springs, $d$, substantially as and for the purposes herein set forth.

3. The rod $e$ attached to the apron E and the guide-rods $f\,f$, in combination with the drum and retracting-spring, substantially as and for the purposes herein set forth.

4. The combination of the scoop J, shaft $h$, with pinion $i$, and the cogged segment $k$ on the main wheel, for intermittently rotating the scoop, substantially as herein set forth.

5. The combination of the drum G, the pinion $m$, secured upon one of the journals thereof, and the cogged segment N secured on the main shaft M, substantially as and for the purposes herein set forth.

6. The hinged spring-cover O, in combination with the rotating scoop J, as and for the purposes herein set forth.

7. In combination with the hinged spring scoop-cover O, having track $n$, the roller P, arms R S, shaft $p$, with spring $s$, lever T, with spring $t$, wire $v$, pulley V, shaft $x$, with pinion $y$, and the cogged segment W on the main shaft M, all substantially as and for the purposes herein set forth.

8. The stationary scoop K, provided with the yielding spring-teeth $z$, substantially as and for the purposes herein set forth.

9. The combination of the fork X, shaft Y, feathered collar Z, rotating vertical shaft A', and stationary inclined track B', substantially as and for the purposes herein set forth.

10. The combination of the pivoted fork X, provided with the lug $i^1$, the spring-bolt $h^1$, rod $k^1$, lever $m^1$, and the lip $n^2$ on the track B', substantially as and for the purposes herein set forth.

11. In combination with the pinion $i$ on the rotating scoop-shaft $h$, the forked lever $p^1$, spring $s^1$, arm $t^1$, and the flange $v^1$ on the main wheel L, substantially as and for the purposes herein set forth.

12. In combination with the scoop-cover O, the spring-ratchet C' with arm $w^1$, flanged sleeve $y'$ with cam $x^1$, and single cog, as described, and the cogged segment $a^2$ on the main wheel L, substantially as and for the purposes herein set forth.

13. The combination of the slotted needle E', pin $k^2$, disk D' with wrist $i^2$, shaft $h^2$, gears $f^2$, shaft $d^2$, with pinion $e^2$, and the cogged segments $b^2$ on the wheel L, substantially as and for the purposes herein set forth.

14. The combination of the hook G', knife H', rack-bar I', and pinion $m^2$ on the shaft $d^2$, substantially as and for the purposes herein set forth.

15. The combination of the forked catch K', springs $p^2$, and pin $s^2$ on the needle-shaft $h^2$, substantially as and for the purposes herein set forth.

16. The thread-catcher L' with hooks $v^2$, in combination with the rod $e^3$ and flanged sleeve $y'$, substantially as and for the purposes herein set forth.

17. The combination of the hinged bail N', with slotted pivoted arm O', the scoop J, thread-catcher L', raised track M', crank-shaft $w^2$, and wheel L, with pin $x^2$, all substantially as and for the purposes herein set forth.

18. The combination of the shaft $d^2$, notched flange $b^3$, pivoted catch $a^3$, and the projection $d^3$, extending from the cogged segment $b^2$, as and for the purposes herein set forth.

In testimony that I claim the foregoing I have hereunto set my hand this 2d day of October, 1875.

E. R. WHITNEY.

Witnesses:
THOS. CONANT,
R. McGEE.